United States Patent [19]

Bartelsen et al.

[11] Patent Number: 4,513,196

[45] Date of Patent: Apr. 23, 1985

[54] ELECTRIC SELF-DEFROSTING WINDSHIELD HEATING ARRANGEMENT PROVIDING FAST OR SLOW HEAT

[75] Inventors: Lutz Bartelsen, Hamminkeln; Hans-Cristoph Neuendorf, Wesel, both of Fed. Rep. of Germany

[73] Assignee: Flachglas Aktiengesellschaft, Gelsenkirchen, Fed. Rep. of Germany

[21] Appl. No.: 514,150

[22] Filed: Jul. 14, 1983

[30] Foreign Application Priority Data

Jul. 15, 1982 [DE] Fed. Rep. of Germany ....... 3226393

[51] Int. Cl.³ ......................... H05B 1/02; H05B 3/26; B60J 1/00; F06B 7/12

[52] U.S. Cl. ...................................... 219/203; 52/171; 219/484; 219/486; 219/522; 219/543; 219/547

[58] Field of Search ............... 219/203, 202, 547, 522, 219/543, 483, 484, 486, 487; 52/171

[56] References Cited

U.S. PATENT DOCUMENTS

| | | | |
|---|---|---|---|
| 1,758,703 | 5/1930 | Johnson | 219/203 X |
| 2,360,299 | 10/1944 | Zaiger | 219/203 |
| 3,475,588 | 10/1969 | McMaster | 219/203 |
| 3,624,354 | 11/1971 | Heidorn | 219/522 X |
| 3,982,092 | 9/1976 | Marriott | 219/203 |

FOREIGN PATENT DOCUMENTS

| | | | |
|---|---|---|---|
| 692313 | 6/1940 | Fed. Rep. of Germany | 219/203 |
| 721765 | 6/1942 | Fed. Rep. of Germany | 219/203 |
| 1912667 | 9/1970 | Fed. Rep. of Germany | 219/522 |
| 2165336 | 7/1973 | Fed. Rep. of Germany | 219/203 |
| 8004971 | 12/1980 | Fed. Rep. of Germany | 219/203 |
| 462641 | 10/1968 | Switzerland | 219/522 |
| 416272 | 9/1934 | United Kingdom | 219/203 |
| 2039173 | 6/1980 | United Kingdom | 219/203 |
| 2042859 | 9/1980 | United Kingdom | 219/543 |

*Primary Examiner*—A. Bartis

*Attorney, Agent, or Firm*—Karl F. Ross; Herbert Dubno

[57] ABSTRACT

An electrically heatable self-defrosting windshield has a transparent panel, two low-resistance groups of wires embedded in the panel and defining a primary zone requiring rapid heating, and at least one high-resistance group of wires embedded in the panel and defining a secondary zone adjacent the primary zone and not requiring rapid heating. A switch connected to the wire groups and to an electric power source is movable between a fast-heat position connecting the two low-resistance groups in parallel with each other across the source and effectively disconnecting the high-resistance wires, and a slow-heat position connecting the two low-resistance groups in series with each other and jointly in parallel with the high-resistance groups across the source. The total resistance of the groups in the fast-heat position is generally the same as in the slow-heat position. Each wire group has a pair of transverse buses flanking the respective zone and connected to the switch means and the wires of each group extend longitudinally and generally parallel to one other between the respective buses.

7 Claims, 4 Drawing Figures

ELECTRIC SELF-DEFROSTING WINDSHIELD HEATING ARRANGEMENT PROVIDING FAST OR SLOW HEAT

FIELD OF THE INVENTION

The present invention relates to a heatable self-defrosting windshield. More particularly this invention concerns such a windshield which has one zone that can be defrosted faster than another.

BACKGROUND OF THE INVENTION

A windshield, which term is here intended to cover a front, rear, or side window or windscreen of an automobile or other vehicle or anything secured thereto, is frequently made self-defrosting by imbedding in it wires that heat when electrically energized. This prevents vapor from condensing on the windshield and even frees same of ice or snow.

The principal disadvantage with this style of defrosting, as opposed to blowing a current of normally warm air over the windshield, is that it is quite slow. Dissipating enough heat electrically in the windshield to effectively defrost it is difficult because the vehicle has a limited supply of eletrical energy.

Hence it is known, as for example from German utility model No. 8,004,971 filed with a claim to an Italian priority date of Feb. 26, 1979, to subdivide the wires into several groups defining a fast-heat area and a slow-heat area. The fast-heat area is normally situated in the center of the field of view, so that this critical region can be defrosted rapidly, while the slow-heat area lies adjacent or around it where defrosting is less critical.

To achieve this effect a group of wires having a relatively low resistance, and therefore large current draw, is provided at the fast-heat zone and a group of wires of greater resistance and smaller current draw is provided at the slow-heat zone. For fast concentrated heating only the central low-resistance zone is connected up, and for slower more generalized heating the wires of the other zone are. This system works fairly well, but has the considerable disadvantage of putting a great load on the voltage source in the fast-heat mode. In the slow-heat mode the load is less, but since in cold weather, when the system is used, a vehicle battery is weakest, this poses a great load at the time when it can least well be borne.

German Pat. No. 692,313 of K. Platte describes another such system that presents a heavy load for fast heating and a smaller load for slow heating. In German Pat. No. 721,765 also of K. Platte the desirability of having the same load in different modes is recognized, but the solution puts a resistor in the circuit to equalize the load, a plain waste of energy.

OBJECTS OF THE INVENTION

It is therefore an object of the present invention to provide an improved heatable self-defrosting windshield.

Another object is the provision of such a heatable self-defrosting windshield which overcomes the above-given disadvantages, that is which presents the same load regardless of operational mode, yet which uses all the electrical energy applied to it efficiently.

SUMMARY OF THE INVENTION

A heatable self-defrosting windshield according to the invention has a transparent panel, two low-resistance groups of wires embedded in the panel and defining a primary zone requiring rapid heating, and at least one high-resistance group of wires embedded in the panel and defining a secondary zone adjacent the primary zone and not requiring rapid heating. A switch connected to the wire groups and to an electric power source is movable between a fast-heat position connecting the two low-resistance groups in parallel with each other across the source and effectively disconnecting the high-resistance wires, and a slow-heat position connecting the two low-resistance groups in series with each other and jointly in parallel with the high-resistance groups across the source. The total resistance of the groups in the fast-heat position is generally the same as in the slow-heat position.

With this type of switching even loading is achieved. At the same time two different heating modes are available for rapidly heating a small portion of the windshield or gently heating the entire area.

According to another feature of this invention each wire group has a pair of transverse buses flanking the respective zone and connected to the switch means and the wires of each group extend longitudinally and generally parallel to one other between the respective buses.

The two low-resistance groups have substantially the same resistance and normally are physically identical. In addition the number of wires in the high-resistance group is greater than the number of wires in both low-resistance groups and the wires of the low-resistance groups are of different resistance from those of the high-resistance group. The wires of the low-resistance groups are of lower resistance than those of the high-resistance group. With this system rapid heating of the one zone and even heating of the entire area is assured.

DESCRIPTION OF THE DRAWING

The above and other features and advantages will become more readily apparent from the following, reference being made to the accompanying drawing in which.

SPECIFIC DESCRIPTION

Figure 1A:
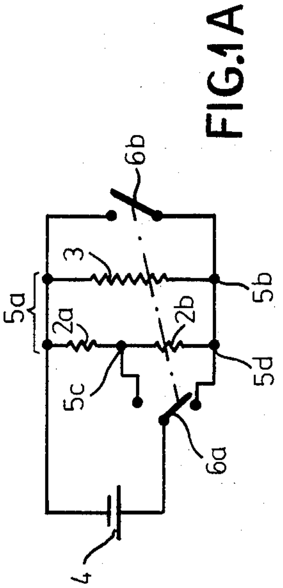
FIG. 1A is a schematic illustrating the system of FIG. 1.
Figure 1:
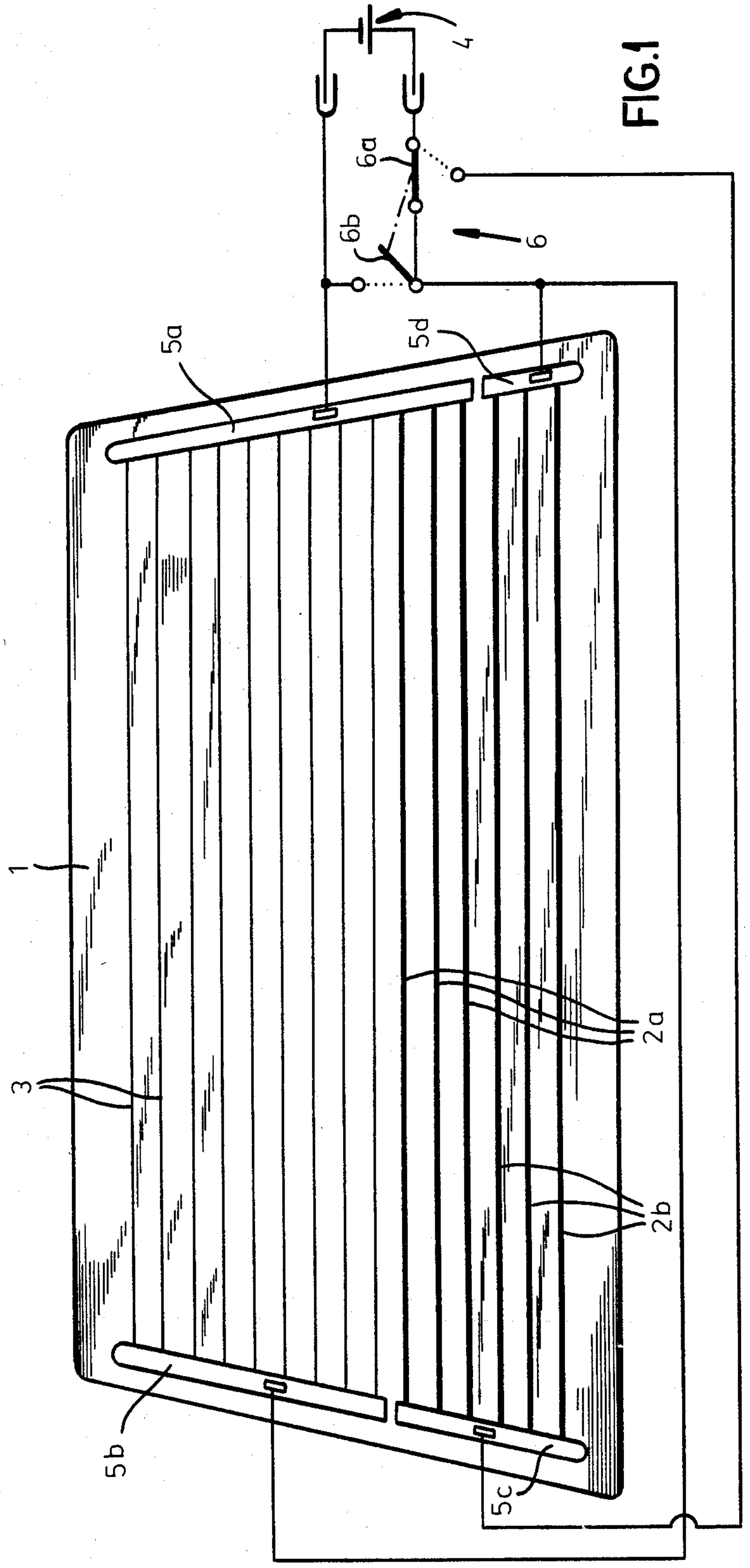
FIG. 1 is a partially schematic view of a system according to this invention.

As seen in FIG. 1 a rectangular windshield panel 1 has an upper zone in which a plurality of nine relatively thin wires 3 extend horizontally and parallel to each other between a pair of buses **5*a* and 5*b* extending vertically along the sides of the panel 1. A lower zone is similarly traversed horizontally by six relatively thick wires 2*a* and 2*b*. The three wires 2*a* are connected at one side in the bus 5*a* and at the other side to a bus 5*c* underneath the bus 5*b*. The three wires 2*b* are connected at one side in the bus 5*c* and at the other side in a bus 5*d* underneath the bus 5*a***.

FIG. 1A also shows how the buses **5*b* and 5*d* are connected together and to one contact of an SPDT part 6*a* of a switch 6 and to one side of an SPST switch part 6*b* ganged therewith. The other contact of the SPDT switch part 6*a* is connected to the bus 5*c*** and the pole of this switch part *6a* is connected to one side of a source 4, here a battery, whose other side is connected to the bus *5a* and to the other side of the SPST switch part *6b*.

Normally the wires *2a*, *2b*, and 3 are nothing more than metallic strips laminated, deposited, or printed on the panel 1, as are the buses *5a–5d*. In accordance with this invention the flow cross-section of the wires *2a* and *2b* is greater than that of the wires 3 or they are otherwise constructed to have less resistance and thereby consume more current.

In accordance with this invention in the slow-heat position of the switch 6 shown in solid lines the two groups *2a* and *2b* are connected in series and jointly in parallel across the group 3, illustrated as resistors in FIG. 1A. Even and low-level heating over the entire panel is thus obtained.

For faster clearing of the zone defined by the wires *2a* and *2b*, the switch 6 is thrown to the dotted-line position. This action shunts out the wires 3 while connecting the two groups *2a* and *2b* in parallel across the source 4. The result is a much higher level of heating in this lower zone for fast defrosting and deicing.

Figure 2A:
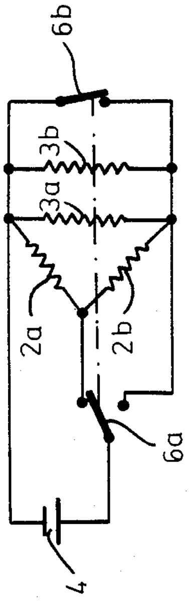
FIG. 2A is a schematic illustrating the system of FIG. 2.
Figure 2:
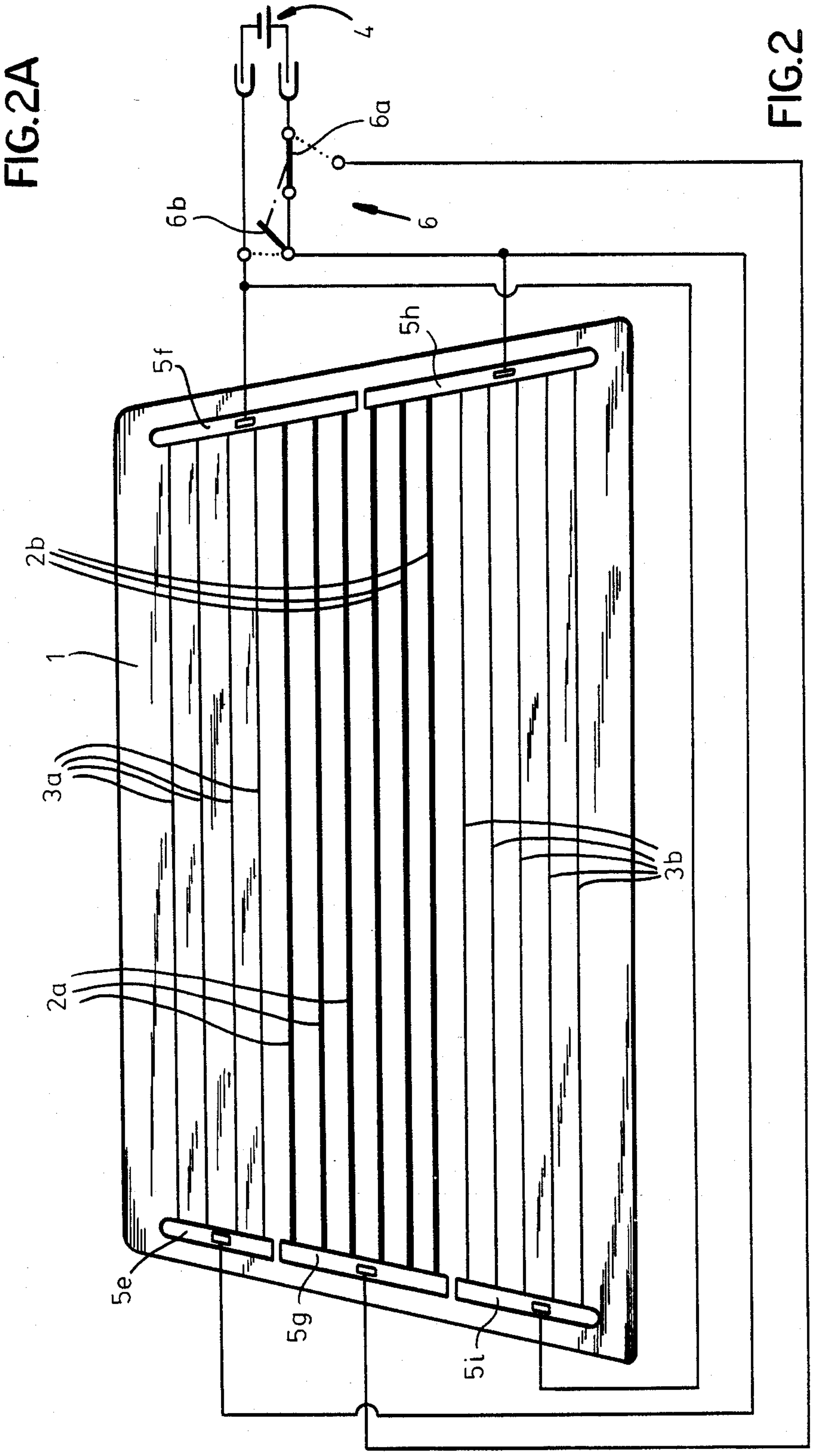
FIG. 2 is a partially schematic view of another system according to this invention.

In the arrangement of FIGS. 2 and 2A the high-heat zone defined by the wires *2a* lies between two low- or slow-heat zones defined by respective groups of wires *3a* and *3b*. Five buses *5e–5i* interconnect these groups of wires *2a–3b* as shown in FIG. 2A, with the two groups *3a* and *3b* permanently in parallel with each other and shuntable by the switch part *6b*. This arrangement works identically to that of FIGS. 1 and 1A, except that here the fast-heat zone is in the middle of the panel.

In order that the load across the power source be identical for the fast-heat and slow-heat modes, it is necessary that the resistances of the three or four wire groups involved bear a definite relationship to each other as defined by Ohm's law. The load across the source in the fast-heat mode can be defined as follows, with R indicating resistance and the following subscript the respective circuit element, so that for the arrangement of FIGS. 1 and 1A as well as for that of FIGS. 2 and 2A:

$$R_{(fast\text{-}heat\ mode)} = R_{2a} \cdot R_{2b} / (R_{2a} + R_{2b}).$$

The load across the source in the slow-heat mode is then, for the arrangement of FIGS. 1 and 1a:

$$R_{(slow\text{-}heat\ mode)} = R_3 \cdot (R_{2a} + R_{2b}) / (R_3 + R_{2a} + R_{2b}).$$

and for FIGS. 2 and 2a:

$$R_{(slow\text{-}heat\ mode)} = R_{3a} \cdot R_{3b} \cdot (R_{2a} + R_{2b}) / (R_{3a} + R_{3b} + R_{2a} + R_{2b}).$$

It is therefore relatively easy for the person skilled in the art to choose the appropriate conductors, normally by deciding on a desired total load and working back to conductor size. Under any circumstances it is clear that the relative areas of the fast-heat and slow-heat zones corresponds to the heating effects, so that if for instance the fast-heat zone was one-third the size of slow-heat zone, four times as much will be dissipated in the fast-heat zone in the fast-heat mode than in the slow-heat mode, when four times the area is heated.

We claim:

1. A heatable self-defrosting windshield comprising:

a transparent panel;

two low-resistance groups of wires embedded in the panel and defining a primary zone requiring rapid heating;

at least one high-resistance group of wires embedded in the panel and defining a secondary zone adjacent the primary zone and not requiring rapid heating; and switch means connected to the wire groups and to an electric power source and movable between a fast-heat position for connecting the two low-resistance groups in parallel with each other across the source and for effectively disconnecting the high-resistance wires, and a slow-heat position for connecting the two low-resistance groups in series with each other and jointly in parallel with the high-resistance groups across the source, the total resistance of the groups in the fast-heat position being generally the same as in the slow-heat position.

2. The heatable self-defrosting windshield defined in claim 1 wherein each wire group has a pair of transverse buses flanking the respective zone and connected to the switch means, the wires of each group extending longitudinally and generally parallel to one other between the respective buses.

3. The heatable self-defrosting windshield defined in claim 1 wherein the two low-resistance groups have substantially the same resistance.

4. The heatable self-defrosting windshield defined in claim 3 wherein the two low-resistance groups are physically identical.

5. The heatable self-defrosting windshield defined in claim 1 wherein the number of wires in the at least one high-resistance group is greater than the number of wires in both low-resistance groups.

6. The heatable self-defrosting windshield defined in claim 1 wherein the wires of the low-resistance groups are of different resistance from those of the at least one high-resistance group.

7. The heatable self-defrosting windshield defined in claim 6 wherein the wires of the low-resistance groups are of lower resistance than those of the at least one high-resistance group.

* * * * *